US009865399B2

(12) United States Patent
Cho et al.

(10) Patent No.: US 9,865,399 B2
(45) Date of Patent: Jan. 9, 2018

(54) ELECTRONIC COMPONENT HAVING MULTILAYER STRUCTURE AND METHOD OF MANUFACTURING THE SAME

(71) Applicant: SAMSUNG ELECTRO-MECHANICS CO., LTD., Suwon-Si, Gyeonggi-Do (KR)

(72) Inventors: Sung Hun Cho, Suwon-Si (KR); Chang Ho Lee, Seoul (KR); Won Sik Chong, Suwon-Si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 80 days.

(21) Appl. No.: 14/876,774

(22) Filed: Oct. 6, 2015

(65) Prior Publication Data

US 2016/0104577 A1 Apr. 14, 2016

(30) Foreign Application Priority Data

Oct. 8, 2014 (KR) ........................ 10-2014-0136068

(51) Int. Cl.
*H01G 4/38* (2006.01)
*H01G 4/012* (2006.01)
*H01G 4/30* (2006.01)
*H01G 4/232* (2006.01)
*H01G 4/12* (2006.01)

(52) U.S. Cl.
CPC ............. *H01G 4/385* (2013.01); *H01G 4/012* (2013.01); *H01G 4/2325* (2013.01); *H01G 4/30* (2013.01); *H01G 4/1227* (2013.01)

(58) Field of Classification Search
CPC ........ H01G 4/385; H01G 4/38; H01G 4/2325; H01G 4/012; H01G 4/30; H01G 4/1227
See application file for complete search history.

(56) References Cited

U.S. PATENT DOCUMENTS

| | | | | |
|---|---|---|---|---|
| 5,870,273 A * | 2/1999 | Sogabe | .................... | H01G 4/40 338/20 |
| 6,181,544 B1 * | 1/2001 | Nakagawa | ............. | H01G 4/228 361/306.1 |
| 6,816,356 B2 * | 11/2004 | Devoe | .................... | H01G 4/228 361/303 |
| 9,398,683 B2 | 7/2016 | Fifield | | |
| 2009/0002918 A1 * | 1/2009 | Kawasaki | ............. | H01G 4/232 361/311 |
| 2014/0043723 A1 | 2/2014 | Hattori et al. | | |

(Continued)

FOREIGN PATENT DOCUMENTS

JP 01066916 A * 3/1989
JP 04096310 A * 3/1992

(Continued)

OTHER PUBLICATIONS

Non-Final Office Action issued in U.S. Appl. No. 15/687,913, dated Nov. 3, 2017.

*Primary Examiner* — David M Sinclair
(74) *Attorney, Agent, or Firm* — McDermott Will & Emery LLP

(57) ABSTRACT

An electronic component of a multi-layered structure includes a laminate formed by stacking a plurality of ceramic bodies and an external electrode made of a conductive resin for connecting each ceramic body.

12 Claims, 13 Drawing Sheets

(56) References Cited

U.S. PATENT DOCUMENTS

| 2015/0062775 A1* | 3/2015 | Shibasaki | H01G 4/30 |
| | | | 361/301.4 |
| 2015/0146343 A1* | 5/2015 | Ellmore | H01G 4/30 |
| | | | 361/301.4 |

FOREIGN PATENT DOCUMENTS

| JP | 08306576 A | * | 11/1996 |
| JP | 2000164450 A | * | 6/2000 |
| JP | 2000-195753 A | | 7/2000 |
| JP | 2012-043947 A | | 3/2012 |

* cited by examiner

ELECTRONIC COMPONENT HAVING MULTILAYER STRUCTURE AND METHOD OF MANUFACTURING THE SAME

CROSS-REFERENCE TO RELATED APPLICATIONS

This application claims priority to under and the benefit of Korean Patent Application Serial No. 10-2014-0136068, filed on Oct. 8, 2014 in the Korean Intellectual Property Office, which is hereby incorporated by reference in its entirety into this application.

TECHNICAL FIELD

The present disclosure relates to an electronic component, and, more particularly, to an electronic component of a stack type structure formed by stacking a plurality of capacitor devices and a method of fabricating the same.

BACKGROUND

In general, a multi-layered ceramic capacitor (MLCC) has a structure that an inner electrode is stacked between a plurality of ceramic sheets as a chip type condenser capable of playing an important role of charging or discharging electric charges by being mounted on a printed circuit board of various electronic appliances such as a mobile communication terminal, a notebook, a computer, a personal digital assistants (PDA).

Such a multi-layered ceramic capacitor has been widely used for various electronic appliances due to the advantage that it is easily mounted with implementing compactness. Particularly, in recent, the capacitor with a large capacity is required according to the trends of high performance and multi-function of the electronic appliances.

Although the most general method for increasing the capacitance of the multi-layered ceramic capacitor is to increase the number of stacked internal electrodes, if the number of inner electrodes increases, the failure such as a crack or a delamination is easily generated due to the large step with a margin part during a stacking process.

As another method for increasing the capacitance, Japanese patent publication No. 2000-195753 discloses a stack type structure capacitor that a laminate is formed by stacking a plurality of capacitor devices in a vertical direction and lead terminals made of a metal material are formed on opposite ends of the laminate so as to electrically connect each of the capacitor devices.

However, since a conventional dielectric material to form the multi-layered ceramic capacitor, e.g., barium titanate, has the properties of piezoelectric and electrostrictive, vibration is generated due to the piezoelectric effect during the application of voltage, and according to the structure suggested in Japanese patent publication No. 2000-195753, the vibration generated in the laminate is transmitted to the substrate through the lead terminals. Since the substrate is operated as an acoustic transducer, the vibration transmitted to the substrate causes acoustic noise.

SUMMARY

The present invention has been invented in order to overcome the above-described problems and it is, therefore, an object of the present invention to provide an electronic component capable of improving a bending strength and a thermal shock by forming external electrodes with strong impact resistance on opposite ends of the stack type capacitor laminate, increasing the reliability by reducing the acoustic noise and suppressing the generations of short and crack as well as implementing the high capacitance by discriminating the usage of the capacitor forming the laminate.

In accordance with a first embodiment of the present invention to achieve the object, there is provided an electronic component capable of absorbing the vibration due to the dielectric and the impact applied from outside by forming the external electrodes equipped on opposite ends of the laminate with a conductive resin in the stack type structure laminate that a plurality of ceramic bodies is stacked.

Herein, the ceramic bodies forming the laminate may be the multi-layered ceramic capacitor (MLCC) that the internal electrodes of different polarities are alternately stacked with sandwiching at least one of the ceramic sheets, and the multi-layered ceramic capacitor having different internal electrode structures can be used when the laminated is formed with such multi-layered ceramic capacitor.

The multi-layered ceramic capacitor used in the present invention may be selected from a group consisting of a normal structure multi-layered ceramic capacitor, an open structure multi-layered ceramic capacitor, a thick & horizontally mounted capacitor (T-HMC) structure multi-layered ceramic capacitors, a float structure multi-layered ceramic capacitor, a T-HMC-open structure multi-layered ceramic capacitor and a T-HMC-Float structure multi-layered ceramic capacitor. Accordingly, in order to secure high electrostatic capacitance as well as improve the acoustic noise reduction and the crack prevention, the present invention arranges the multi-layered ceramic capacitor selected from one of an open structure multi-layered ceramic capacitor, a T-HMC structure multi-layered ceramic capacitors, a float structure multi-layered ceramic capacitor, a T-HMC-open structure multi-layered ceramic capacitor and a T-HMC-Float structure multi-layered ceramic capacitor at a most bottom of the laminate, and the normal structure multi-layered ceramic capacitor is stacked thereon.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION

Figure 1:
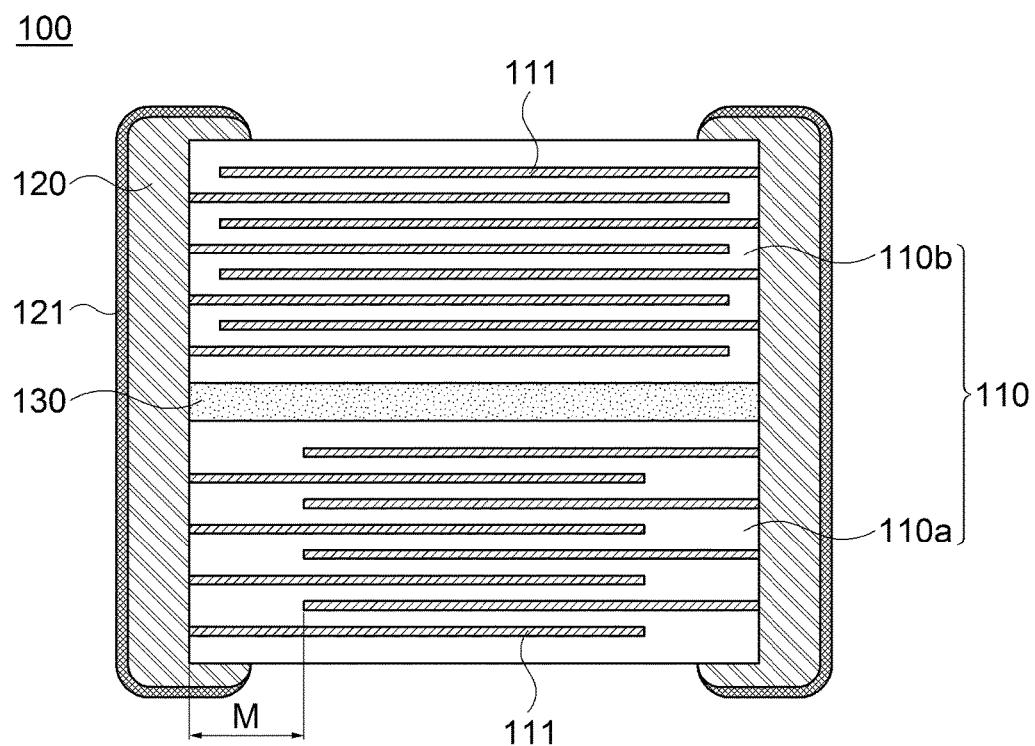
FIG. 1 is a cross-sectional view showing an electronic component in accordance with one embodiment of the present invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The exemplary embodiments are provided only for completing the disclosure of the present invention and for fully representing the scope of the present invention to those skilled in the art.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

On the other hands, for simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

Hereinafter, the configurations and operational effects of the present invention will be described in detail with reference to the accompanying drawings so that those skilled in the art can easily practice the present invention. The same reference numerals in different figures denote the same elements.

FIG. 1 is a cross-sectional view showing an electronic component in accordance with one embodiment of the present invention.

Referring to FIG. 1, an electronic component 100 in accordance with an embodiment of the present invention includes a laminate 110 formed by stacking a plurality of ceramic bodies 110a and 110b and a plurality of external electrodes 120 formed on opposite ends of the laminate 110, as a stack type electronic component having the plurality of ceramic bodies 110a and 110b stacked in a vertical direction. According to such a structure, the plurality of ceramic bodies 110a and 110b are connected to the pair of external electrodes 120 in parallel.

In the embodiment of the present invention, the ceramic bodies 110a and 110b exemplifies a multi-layered ceramic capacitor (MLCC) in which the internal electrodes 111 with different polarities are alternately stacked in between at least one of the ceramic sheets inside of the body formed of a dielectric material such as barium titanate, as a unit of the electronic component being in charge of a predetermined function during the application of voltage by forming the internal electrodes 111 inside of the body made of a ceramic material. Herein, in case when the ceramic bodies 110a and 110b are an MLCC, each MLCC is constructed to have different electrostatic capacitances. The internal electrodes 111 of ceramic bodies 110a and 110b may include a first boundary internal electrode and a second boundary internal electrode. All the other internal electrodes 111 of the ceramic bodies 110a and 110b may be interposed between the first and second boundary internal electrodes.

The ceramic bodies 110a and 110b may be stacked in between an adhesive 130. That is, the ceramic body 110a at the bottom side and the ceramic body 110b at the top side are bonded via the insulating adhesive 130 such as an epoxy resin. On the other hands, in order to improve the heat discharge characteristics, a member having high thermal conductivity such as alumina can be used as the material of the adhesive 130.

The pair of external electrodes 120 is formed on opposite ends of the laminate 110, thereby assigning different polarities to the ceramic bodies 110a and 110b. For example, the external electrode 120 formed on a left side end of the laminate 110 is electrically connected to the internal electrode 111 exposed to the left side surface of the ceramic bodies 110a and 110b, thereby assigning (+) polarity or (−) polarity, and the external electrode 120 formed on a right side end of the laminate 110 is electrically connected to the internal electrode 111 exposed to the right side surfaces of each of the ceramic bodies 110a and 110b, thereby assigning the opposite polarity of the external electrode 120 at the left side end.

Herein, the external electrode 120 is made of an electrically conductive resin obtained by dispersing a metal powder into a polymer resin. Although the metal powder can be any one selected from a group consisting of Ag, Cu, Pd, Pt and an alloy thereof, but it is not limited thereto, if it is electrically conductive.

A thermosetting epoxy group resin may be used as a polymer resin. Besides, if elasticity can be applied to the external electrode 120, another resin, e.g., the thermosetting resin such as PE, ABS, PA or the like, can be used. In case of using the thermosetting resin, the elasticity of the external electrode 120 can be controlled by controlling the amount of a hardening agent.

Like this, in case when the external electrodes 120 assigned thereto have the elasticity in the stack type structure electronic component, acoustic noise can be reduce by preventing the vibration due to the piezoelectric effect of the dielectric material from being transferred to a substrate (not shown). And also, the generation of crack can be suppressed by protecting the ceramic bodies 110a and 110b from the external impact applied during the manufacturing process such as a sintering process or a polishing process or when the electronic component is mounted on the substrate.

On the other hands, a metal layer 121 may be coated on a surface of the external electrode 120 for the convenience of mounting. For example, the metal layer 121 may include a first metal layer formed by including Ni as a main component formed on the surface of the external electrode 120 and a second metal layer formed by including Sn as a main component formed on the surface of the first metal layer.

In order to further intensify the reduction of acoustic noise and the crack prevention due to the external impact, according to other embodiments, different multi-layered ceramic capacitors having the internal electrodes with different structures as the ceramic bodies 110a and 110b may be used to form the laminate 110. A width of each internal electrode 111 of the ceramic body 110a is less than that of each internal electrode 111 of the ceramic body 110b. In a vertical direction along which the ceramic bodies 110a and 110b stack, each internal electrode 111 of the ceramic body 110a may overlap with extension portions of only one of the external electrodes 120, and in the vertical direction, each internal electrode 111 of the ceramic body 111b may overlap with the extension portions of both of the external electrodes 120.

Herein, the structure of the internal electrode 111 is classified into a normal structure, an open structure, a thick & horizontally mounted capacitor structure (T-HMC), a float structure, a T-HMC-open structure and a T-HMC-float structure according to the formation position and size or the like of the internal electrode 111. A capacitance of the ceramic body 110a may be less than a capacitance of the ceramic body 110b.

Figure 2A:
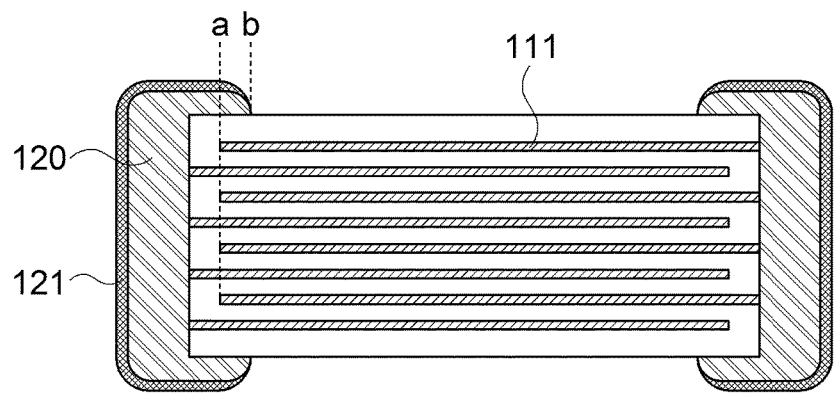
FIGS. 2A through 2F are cross-sectional views showing multi-layered ceramic capacitors applicable to an embodiment of the present invention.
Figure 2B:
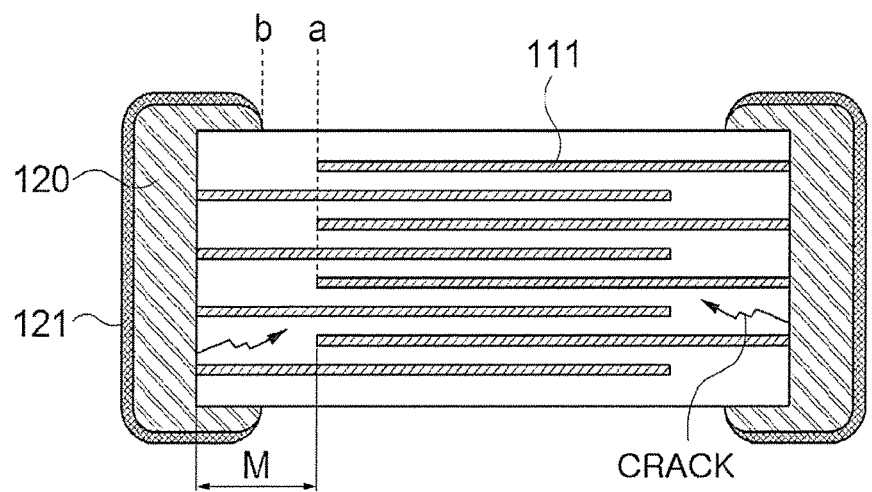
Figure 2C:
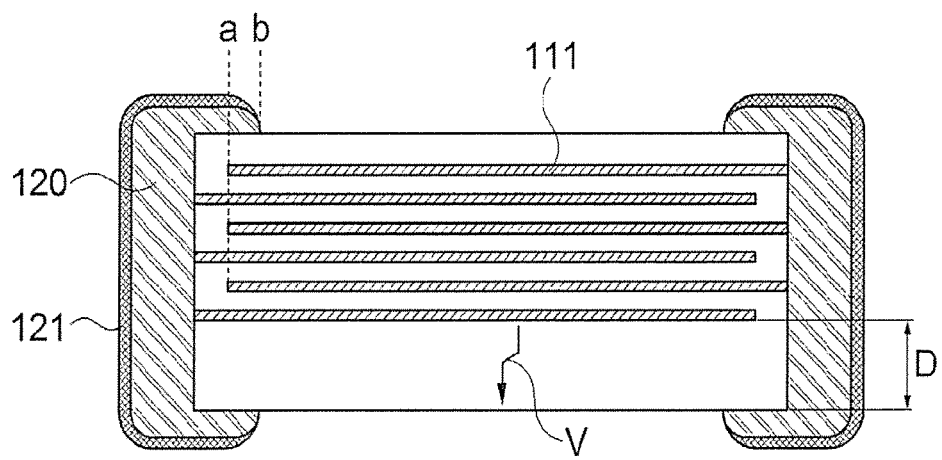
Figure 2D:
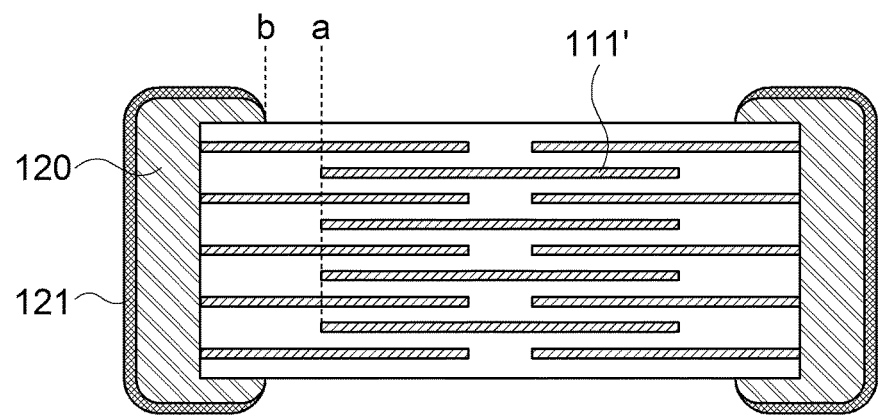
Figure 2E:
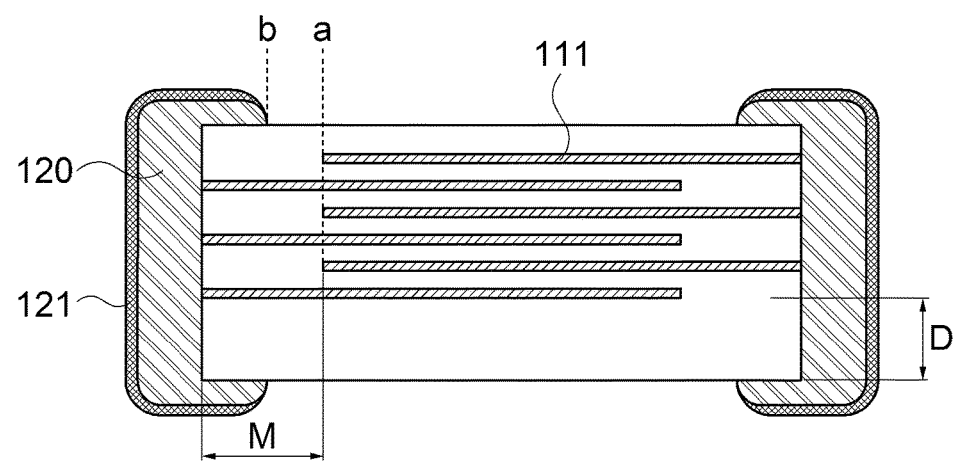
Figure 2F:
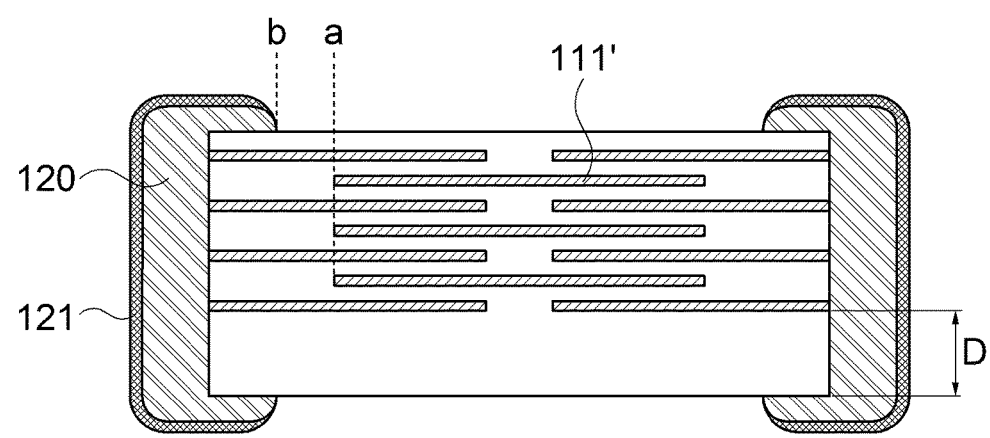

FIGS. 2A through 2F are cross-sectional views showing multi-layered ceramic capacitors applicable to an embodiment of the present invention. Particularly, FIG. 2A shows a normal structure multi-layered ceramic capacitor, FIG. 2B shows an open structure multi-layered ceramic capacitor, FIG. 2C shows a T-HMC structure multi-layered ceramic capacitor, FIG. 2D shows a float structure multi-layered ceramic capacitor, FIG. 2E shows a T-HMC-open structure multi-layered ceramic capacitor, and FIG. 2F shows a T-HMC-float structure multi-layered ceramic capacitor.

Referring to FIG. 2A, the normal structure multi-layered ceramic capacitor may be defined as a conventional structure capacitor capable of maximizing the area of the internal electrodes 111 by positioning ends (virtual line a) of the internal electrodes 111 at an outside with reference to an end (defined by a virtual line b) of the external electrode 120.

Referring to FIG. 2B, the open structure multi-layered ceramic capacitor may be defined as a capacitor structure capable of forming a margin portion M by positioning ends (virtual line a) of the internal electrodes 111 inside with reference to an end (virtual line b) of the external electrode 120.

And, referring to FIG. 2C, the T-HMC structure multi-layered ceramic capacitor may be defined as a capacitor structure capable of forming a space D between the internal electrode 111 at the lowermost layer and the bottom surface of the body larger than that between the internal electrode 111 at the uppermost layer and the top surface of the body larger.

And, Referring to FIG. 2D, the float structure multi-layered ceramic capacitor may be defined as a capacitor structure in which floating internal electrodes 111' that are not connected to any external electrodes 120 are arranged at the middle of the body, wherein opposite ends (virtual line a) of the floating internal electrodes 111' are placed inside with reference to ends (virtual line b) of the external electrode 120s. In addition, one of the first internal electrodes exposed to the left end of the ceramic body and one of the internal electrodes exposed to the right end of the ceramic body may be formed on a same plane.

And, referring to FIG. 2E, the T-HMC-open structure multi-layered ceramic capacitor may be defined as a capacitor formed by combining the T-HMC structure and the open structure. Referring to FIG. 2F, the T-HMC-float structure multi-layered ceramic capacitor may be defined as a capacitor formed by combining the T-HMC structure and the float structure.

If the prevention of crack due to the external impact takes priority over all else, as shown in FIG. 1, the laminate 110 can be formed by using the open structure multi-layered ceramic capacitor. Since the open structure multi-layered ceramic capacitor forms the margin portion M large, as shown in FIG. 2B, although a crack may be is generated, it does not reach to the internal electrode 111, the laminate 110 can be protected from the external impact.

Herein, the crack generated during the process to mount the electronic component on the substrate is transmitted to the inside of the body by being started from the bottom surface of the body being in contact with the substrate directly, it is proper that the open structure multi-layered ceramic capacitor is used as the ceramic body 110a arranged at the lowermost surface of the laminate 110.

Merely, since the electrostatic capacitance of the open structure multi-layered ceramic capacitor becomes small in proportional to the percentage of the area decrement, the normal structure multi-layered ceramic capacitor can be used as the remaining ceramic body 110b except the multi-layered ceramic capacitor at the lowermost surface in order to secure the high electrostatic capacitance.

Figure 3:
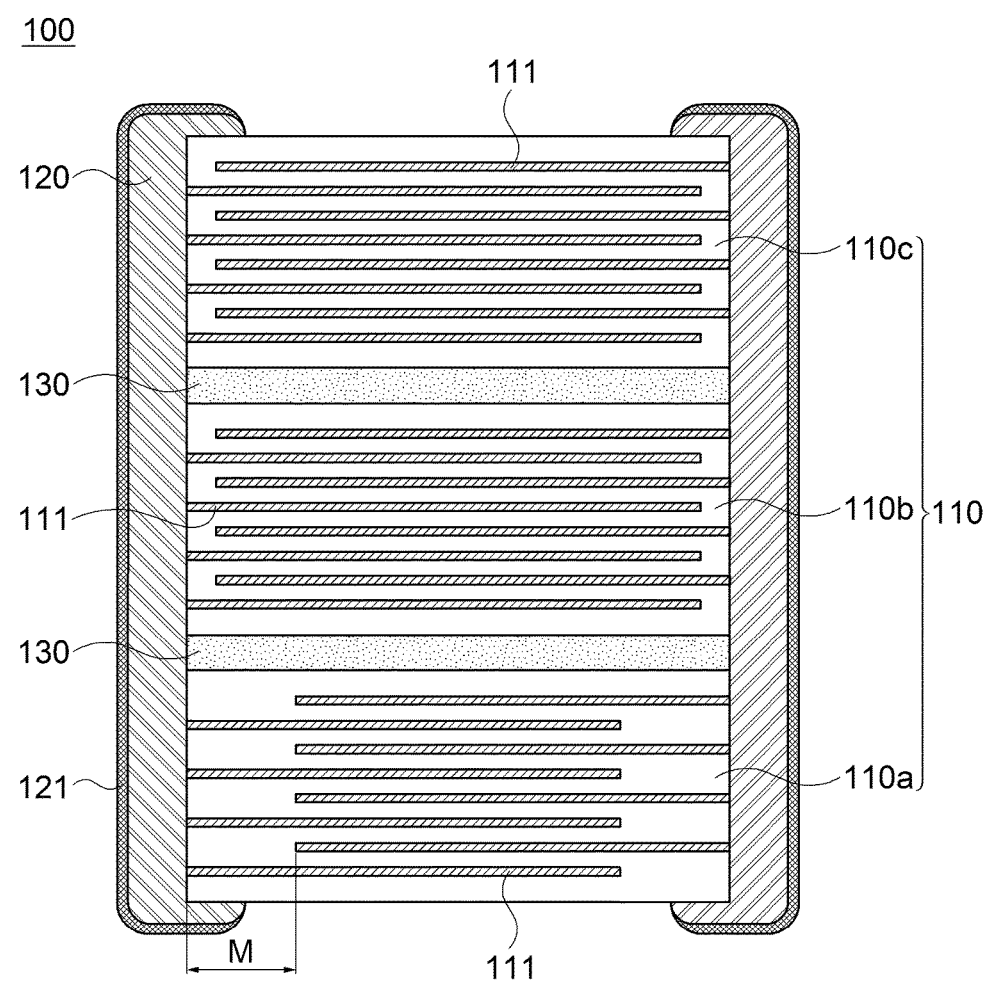
FIG. 3 is a cross-sectional view showing an electronic component in accordance with another embodiment of the present invention.

As FIG. 3 is a cross-sectional view showing an electronic component in accordance with another embodiment of the present invention, the number of ceramic bodies 110a, 110b and 110c forming the laminate 110 may be three or more than three.

Herein, in order to implement the maximum effect, the ceramic body 1101 arranged at the lowermost surface is used as the open structure multi-layered ceramic capacitor and the remaining ceramic bodies 110b and 110c may be used as the normal structure multi-layered ceramic capacitors. According to such configuration, the overall of the laminate 110 can be protected by suppressing the propagation of the crack from the bottom in the open structure multi-layered ceramic capacitor, and the high electrostatic capacitance can be secured through the normal structure multi-layered ceramic capacitor. The internal electrodes 111 of ceramic bodies 110a, 110b, and 110c may include a first boundary internal electrode and a second boundary internal electrode. All the other internal electrodes 111 of the ceramic bodies 110a, 110b, and 110c may be interposed between the first and second boundary internal electrodes. A width of each internal electrode 111 of the ceramic body 110a may be less than that of each internal electrode 111 of the ceramic bodies 110b and 110c. In a vertical direction along which the ceramic bodies 110a, 110b, and 110c stack, each internal electrode 111 of the ceramic body 110a may overlap with extension portions of only one of the external electrodes 120, and in the vertical direction, each internal electrode 111 of the ceramic bodies 111b and 110c may overlap with the extension portions of both of the external electrodes 120. A capacitance of the ceramic body 110a may be less than a capacitance of each of the remaining ceramib bodies 110b and 110c.

Figure 4A:
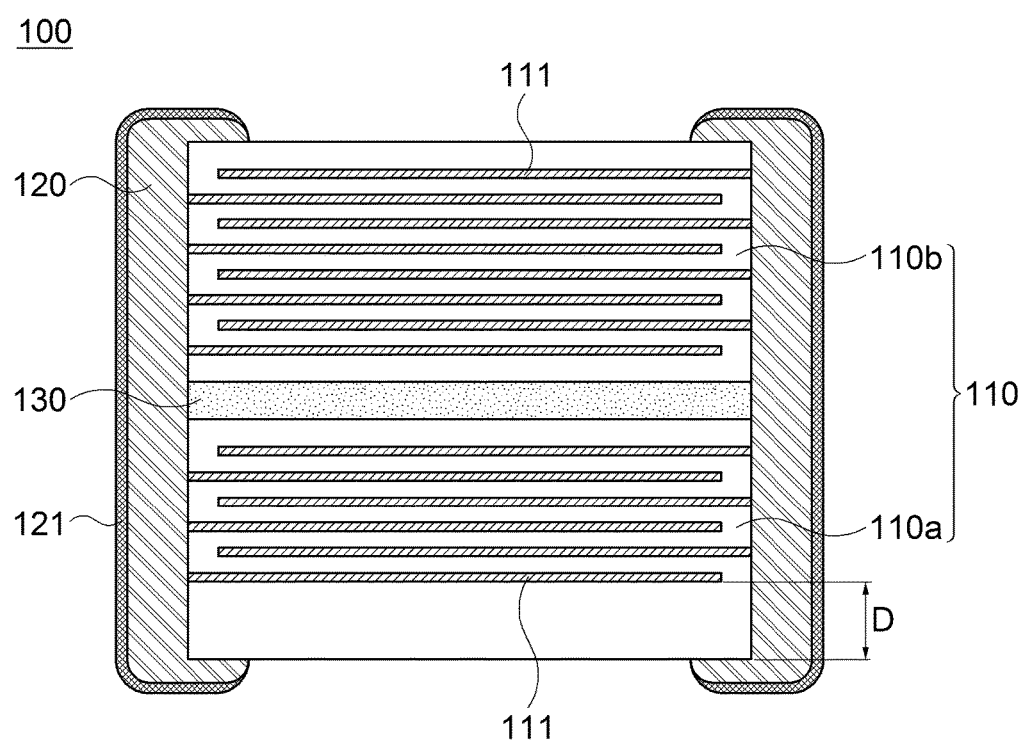
FIG. 4A is a cross-sectional view showing an electronic component in accordance with another embodiment of the present invention.
Figure 4B:
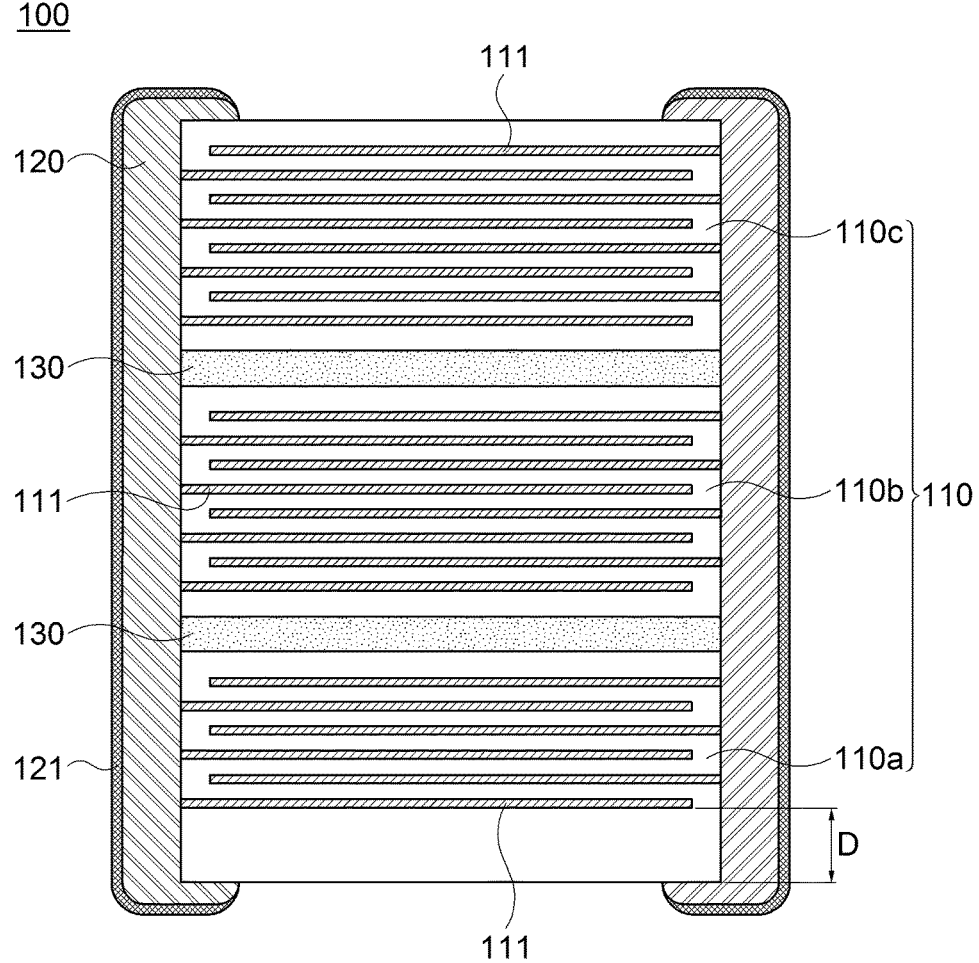
FIG. 4B is a diagram showing an embodiment that the ceramic body is formed with three ceramic bodies.

FIG. 4A is a cross-sectional view showing an electronic component including two multi-layered ceramic capacitors in accordance with another embodiment of the present invention, and FIG. 4B is a diagram showing an embodiment that the ceramic body is formed of three multi-layered ceramic capacitors.

If the reduction of acoustic noises takes priority over all else, as shown in FIG. 4A, the laminate 110 can be formed by using the T-HMC structure multi-layered ceramic capacitor. The internal electrodes 111 of ceramic bodies 110a and 110b may include a first boundary internal electrode and a second boundary internal electrode. All the other internal electrodes 111 of the ceramic bodies 110a and 110b may be interposed between the first and second boundary internal electrodes. A distance D between the first boundary internal electrode and a bottom exterior surface of the laminate 110 connected between the ends of the laminate 110 may be larger than a distance between the second boundary internal electrode and a top exterior surface of the laminate 110 connected between the ends of the laminate 110, and may be larger than any distances of the one or more adhesive layers 130 to the internal electrodes 111 which are immediately adjacent to the respective one or more adhesive layers 130. The distance between the second boundary internal electrode and the top surface of the laminate 110 connected between the ends of the laminate 110, and each distance between the one or more adhesive layers 130 and the internal electrodes 111 which are immediately adjacent to the respective one or more adhesive layers 130, may be substantially equal to each other. In a vertical direction along which the ceramic bodies 110a and 110b stack, each internal electrode 111 may overlap with extension portions of both of the first and second external electrodes 120. A capacitance of the ceramic body 110a may be less than a capacitance of the ceramib body 110b. Since the T-HMC structure multi-layered ceramic capacitor forms the space D between the inner electrode 111 at the lowermost layer of the inner electrode 111 and the bottom surface of the body large, as shown in FIG. 2C, the vibration V due to the piezoelectric effect cannot reach to the substrate to thereby reduce the acoustic noises.

But, since the number of stacking the inner electrodes 111 is necessarily reduced by the amount of widening the space D between the inner electrode 111 at the lowermost layer of the inner electrode 111 and the bottom surface of the body, the T-HMC structure multi-layered ceramic capacitor is used as the ceramic body 110a arranged at the lowermost surface of the laminate 110, in order to secure the high electrostatic capacitance, the normal structure multi-layered ceramic capacitor can be used as the remaining ceramic body 110b except the multi-layered ceramic capacitor at the lowermost surface. At this time, as shown in FIG. 4B, two or more normal structure multi-layered ceramic capacitors may be stacked on top of the T-HMC structure multi-layered ceramic capacitor. In this case, the internal electrodes 111 of ceramic bodies 110a, 110b, and 110c may include a first boundary internal electrode and a second boundary internal electrode. All the other internal electrodes 111 of the ceramic bodies 110a, 110b, and 110c may be interposed between the first and second boundary internal electrodes. A distance D between the first boundary internal electrode and a bottom exterior surface of the laminate 110 connected between the ends of the laminate 110 may be larger than a distance between the second boundary internal electrode and a top exterior surface of the laminate 110 connected between the ends of the laminate 110, and may be larger than any distances of the one or more adhesive layers 130 to the internal electrodes 111 which are immediately adjacent to the respective one or more adhesive layers 130. The distance between the second boundary internal electrode and the top surface of the laminate 110 connected between the ends of the laminate 110, and each distance between the one or more adhesive layers 130 and the internal electrodes 111 which are immediately adjacent to the respective one or more adhesive layers 130, may be substantially equal to each other. In a vertical direction along which the ceramic bodies 110a, 110b, and 110c stack, each internal electrode 111 may overlap with extension portions of both of the first and second external electrodes 120. A capacitance of the ceramic body 110a may be less than a capacitance of each of the remaining ceramic bodies 110b and 110c.

Figure 5A:
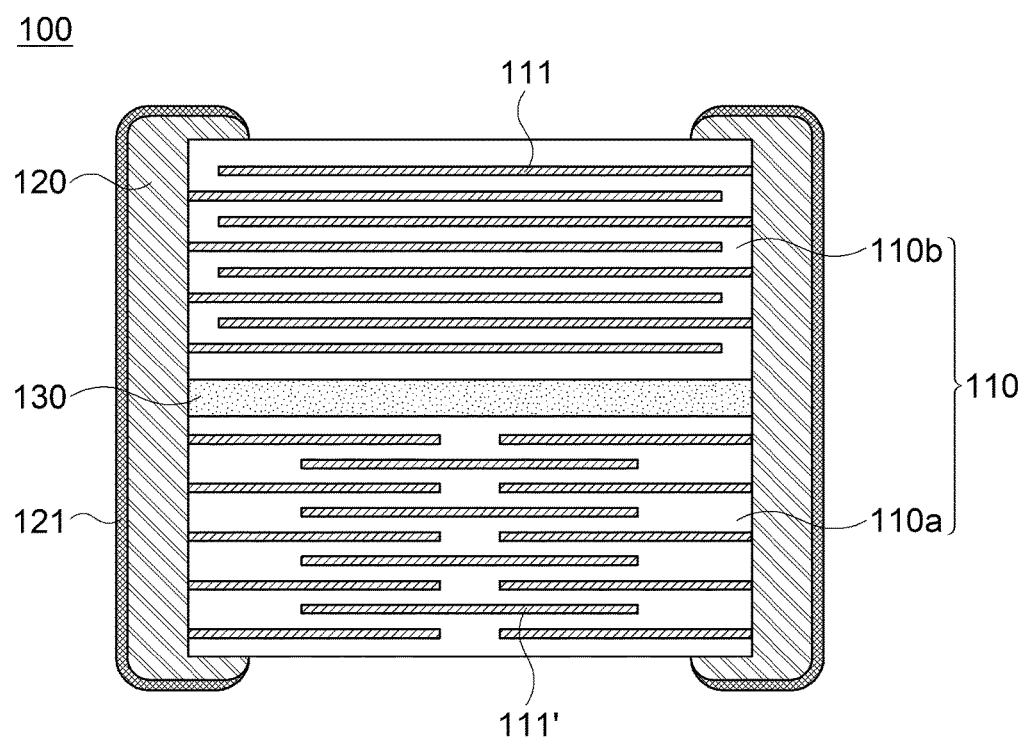
FIG. 5A is a cross-sectional view showing an electronic component in accordance with another embodiment of the present invention.
Figure 5B:
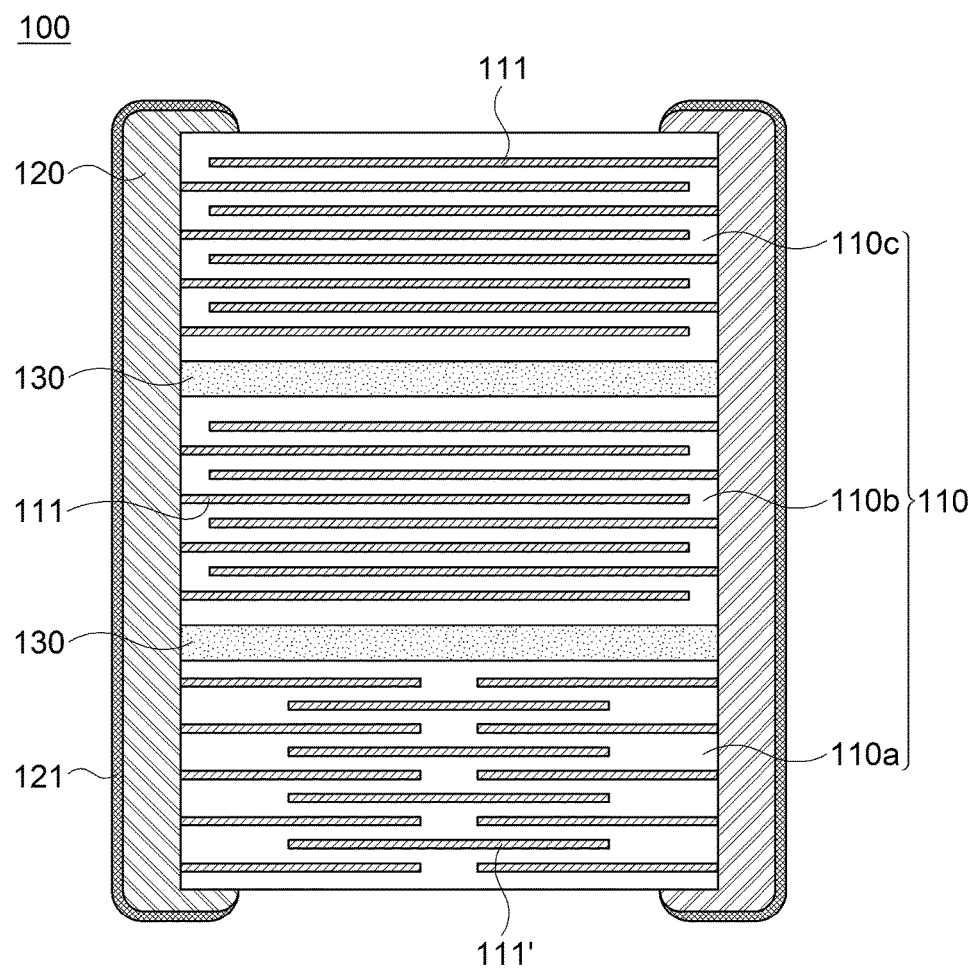
FIG. 5B is a diagram showing an embodiment that the ceramic body is formed with three ceramic bodies.

FIG. 5A is a cross-sectional view showing an electronic component in accordance with another embodiment of the present invention and FIG. 5B is a diagram showing an embodiment that the ceramic body is formed with three ceramic bodies.

If the prevention of shorts between the inner electrodes 111 and the external electrodes 120 takes priority over all else, as shown in FIG. 5A, the laminate 110 can be formed by using the float structure multi-layered ceramic capacitor. Since the float structure multi-layered ceramic capacitor is an open structure that the inner electrodes 111 provided in the middle of the body are separated from both sides of the external electrodes 120 by a predetermined space, although the crack due to the external impact or the ceramic contraction during the sintering process is generated, the shorts with the external electrodes 120 can be prevented.

And, even when the float structure capacitor is used, by using the norm structure multi-layered ceramic capacitors as the remaining except the float structure capacitor, the high electrostatic capacitance can be secured, at this time; and, the normal structure multi-layered ceramic capacitor may be formed of at least two, as shown in FIG. 5B.

Figure 6:
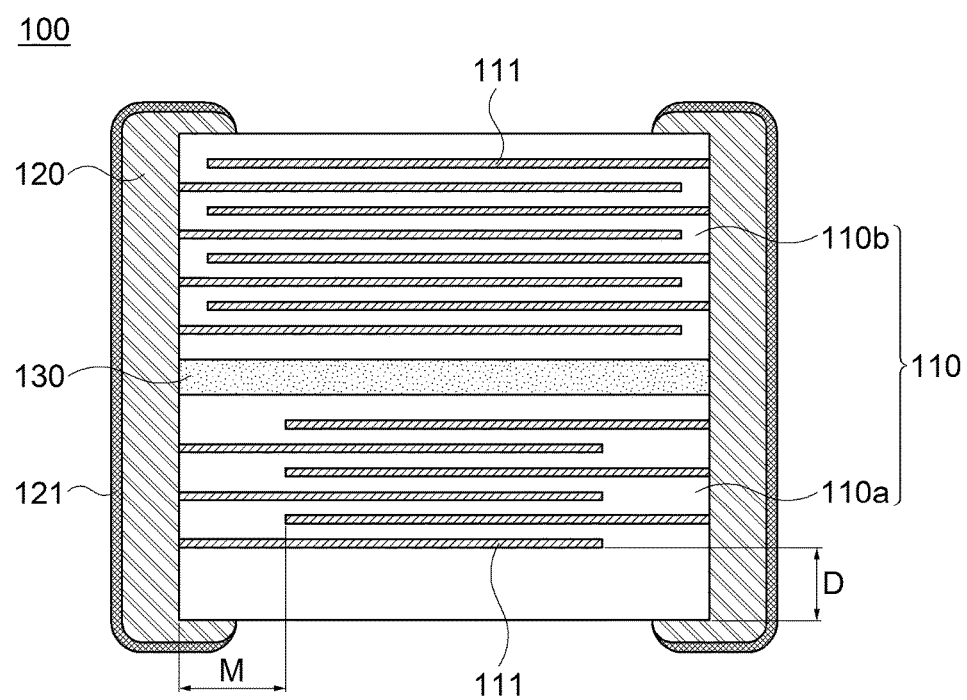
FIG. 6 to FIG. 8 are cross-sectional views showing an electronic component in accordance with another embodiment of the present invention.
Figure 7:
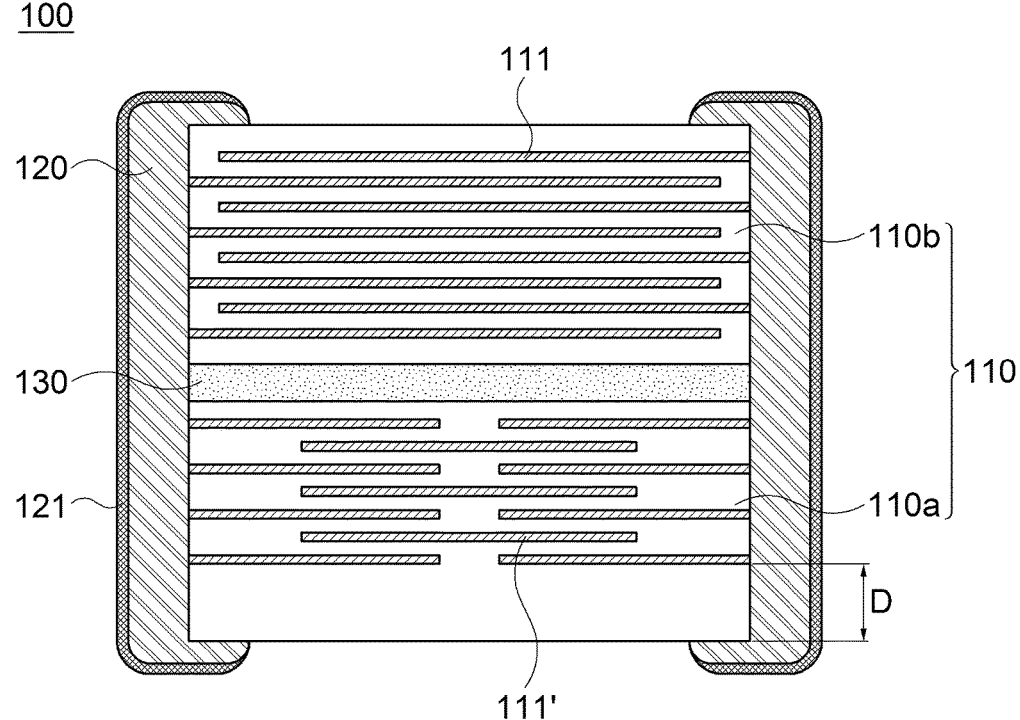
Figure 8:
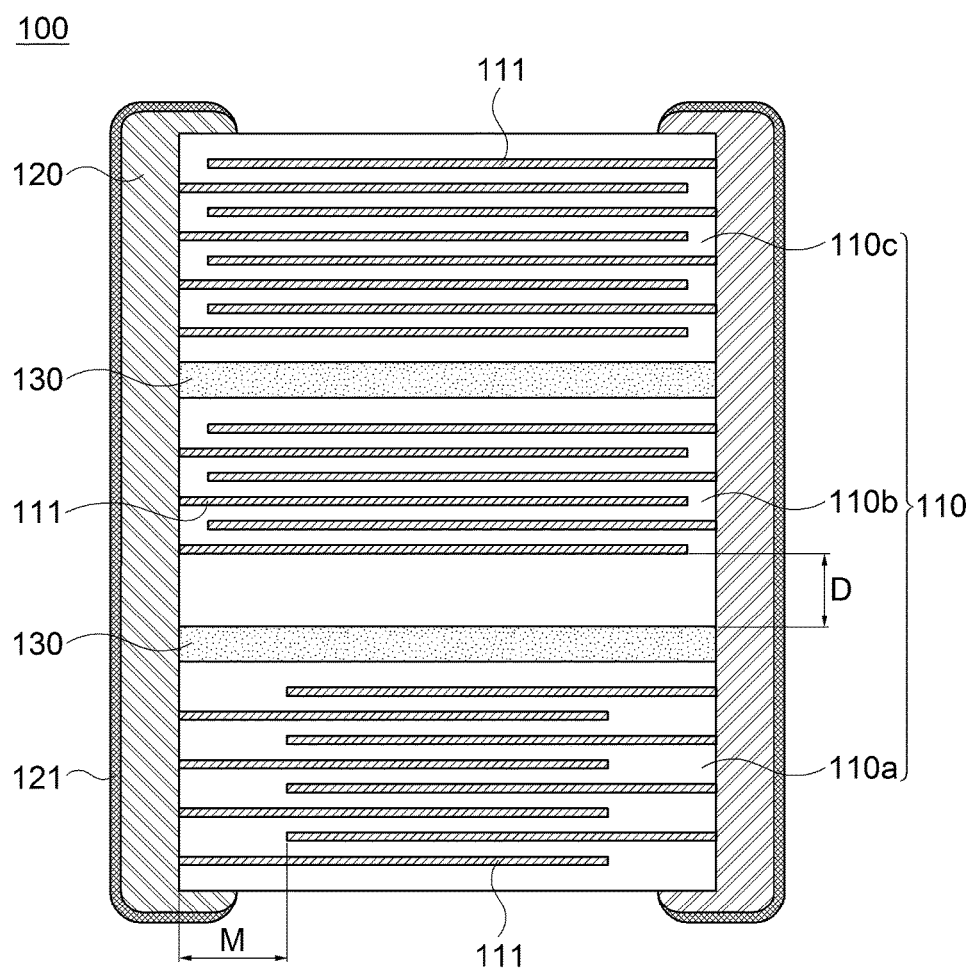

FIG. 6 to FIG. 8 are cross-sectional views showing an electronic component in accordance with another embodiment of the present invention. The same reference numerals will be used to refer to the same or like parts as those described in precious embodiment, and any further explanation will be omitted.

The present invention can arrange the T-HMC-open structure multi-layered ceramic capacitor at the lowermost surface of the laminate 110, as the embodiment of FIG. 6, in order to achieve the prevention of crack and short due to the external impacts and the reduction of acoustic noise at the same time or can arrange the T-HMC-float structure multi-layered ceramic capacitor at the lowermost surface of the laminate 110, as the embodiment of FIG. 7.

Or, as the embodiment of FIG. 8, the ceramic bodies 110a, 110b and 110c are formed of three, and the open structure multi-layered ceramic capacitor, the T-HMC structure multi-layered ceramic capacitor and the normal structure multi-layered ceramic capacitor can be stacked in order from the lowermost surface of the laminate 110. That is, in the open structure multi-layered ceramic capacitor arranged at the lowermost surface, the crack transmitted inside of the body is suppressed, in the T-HMC-open structure multi-layered ceramic capacitor arranged in the middle, the vibration due to the piezoelectric effect is prevented from being transmitted to the substrate and the high electrostatic capacitance can be secured through the normal structure multi-layered ceramic capacitor arranged at the uppermost surface.

Although, in the embodiment of FIG. 8, there is explained that two ceramic bodies 110a and 110b stacked from the lowermost surface of the laminate are the open structure multi-layered ceramic capacitor and the T-HMC structure multi-layered ceramic capacitor as an example, but it is not limited thereto, the ceramic bodies 110a and 110b may be variously formed by combining the open structure, the T-HMC structure, the float structure, the T-HMC-open structure, the T-HMC-float structure or the like.

Hereinafter, the method of manufacturing the electronic component of the present invention will be explained.

Figure 9:
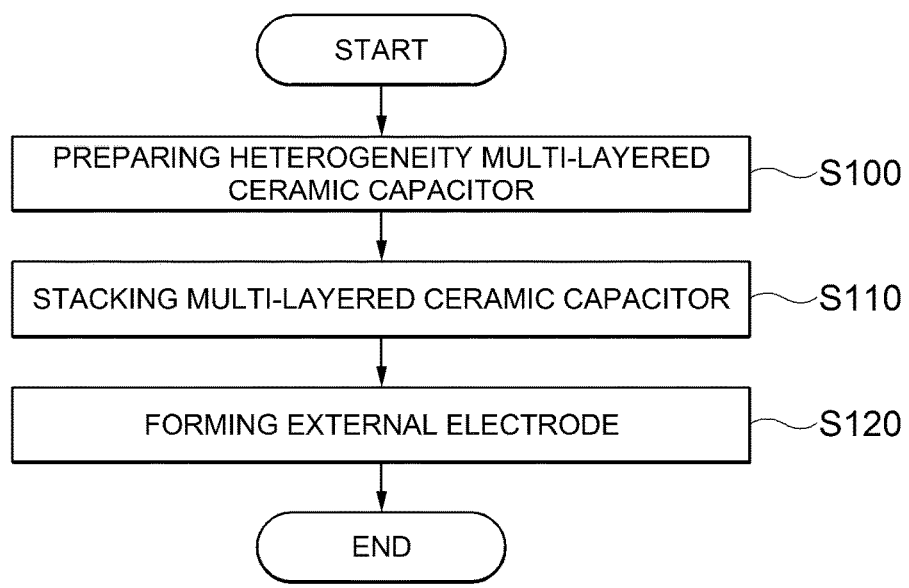
FIG. 9 is a flow chart showing a method of manufacturing an electronic component in accordance with another embodiment of the present invention.

As FIG. 9 is a flow chart showing a method of manufacturing an electronic component in accordance with another embodiment of the present invention, a plurality of different multi-layered ceramic capacitors are prepared (S100) as a first step to manufacture the electronic component of the present invention. Particularly, the multi-layered ceramic capacitor may be selected from a group consisting of a normal structure multi-layered ceramic capacitor, an open structure multi-layered ceramic capacitor, a thick & horizontally mounted capacitor (T-HMC) structure multi-layered ceramic capacitors, a float structure multi-layered ceramic capacitor, a T-HMC-open structure multi-layered ceramic capacitor and a T-HMC-Float structure multi-layered ceramic capacitor.

Thereafter, a step of stacking the prepared plurality of multi-layered ceramic capacitors is performed (S110). At this time, after the adhesive resin is coated between the multi-layered ceramic capacitor at the top side and the multi-layered ceramic capacitor at the bottom side to be cured, the multi-layered ceramic capacitors at the top and bottom sides can be stably fixed.

In the present step, the products capable of securing the high electrostatic capacitance as well as preventing the crack due the external impact and the acoustic noises due to the piezoelectric effect by arranging the multi-layered ceramic capacitor selected from one of an open structure, a T-HMC structure, a float structure, a T-HMC-open structure and a T-HMC-Float structure at a lowermost bottom of the laminate and stacking the normal structure multi-layered ceramic capacitor thereon. At this time, the normal structure multi-layered ceramic capacitors can be stacked at least two.

Or, when three multi-layered ceramic capacitors are stacked, the electronic component in accordance with the present invention can be manufactured by arranging the multi-layered ceramic capacitor selected from one of an open structure, a T-HMC structure, a float structure, a T-HMC-open structure and a T-HMC-Float structure at a lowermost bottom, stacking thereon the multi-layered ceramic capacitor different from the multi-layered ceramic capacitor arranged at the lowermost bottom among one of an open structure, a T-HMC structure, a float structure, a T-HMC-open structure and a T-HMC-Float structure and stacking the normal structure multi-layered ceramic capacitor at the uppermost top surface.

Finally, the electronic component of the present invention is finished (S120) by forming the external electrode 120 made of a conductive resin on opposite ends of the laminate 110 stacked thereon the plurality of multi-layered ceramic capacitors.

The external electrode 120 may be formed by coating a conductive paste on opposite ends of the laminate 110 and sintering the coated conductive paste. Herein, the method for coating the conductive paste is not limited to a specific method, for example, various methods such as a dipping, a painting, a printing or the like can be used.

The conductive paste may be manufactured by adding the metal powder, e.g., at the state that the epoxy resin and the hardening agent are solved by the solvent. Accordingly, the solvent is removed in the drying process and the epoxy resin is cured by the following heat treatment thereby forming the external electrode 120 having the elasticity.

In accordance with the present invention, since the mechanical vibration and the external impact are absorbed through the external electrode having the elasticity, the generation of crack transmitted inside of the ceramic body is suppressed and the piezoelectric vibration transmitted to the substrate is blocked to thereby reduce the acoustic noise.

And also, according to constructing the laminate with the plurality of different multi-layered ceramic capacitors, the high electrostatic capacitance can be secured by reducing the acoustic noise and preventing the crack and the short failure due to the external impact.

The foregoing description illustrates the present invention. Additionally, the foregoing description shows and explains only the preferred embodiments of the present invention, but it is to be understood that the present invention is capable of use in various other combinations, modifications, and environments and is capable of changes and modifications within the scope of the inventive concept as expressed herein, commensurate with the above teachings and/or the skill or knowledge of the related art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An electronic component comprising:
   a laminate having a plurality of stacked different types of multi-layered ceramic capacitors; and
   an external electrode made of a conductive resin for connecting each ceramic body,
   wherein two multi-layered ceramic capacitors stacked from at a lowermost surface of the laminate sequentially are selected among a T-HMC structure multi-layered ceramic capacitor, a T-HMC-open structure multi-layered ceramic capacitor, and a T-HMC-Float structure multi-layered ceramic capacitor, and
   the remaining except two multi-layered ceramic capacitors stacked from the lowermost surface sequentially are normal structure multi-layered ceramic capacitors.

2. The electronic component according to claim 1, further comprises:
   an adhesive for adhering between the multi-layered ceramic capacitors.

3. The electronic component according to claim 1, further comprises:
   a metal layer plated on a surface of the external electrode.

4. An electronic component comprising:
   a laminate including a plurality of ceramic bodies stacking one on another and one or more adhesive layers interposed therebetween, each ceramic body including a plurality of first internal electrodes exposed to one end of the laminate and a plurality of second internal electrodes exposed to another end of the laminate, and the first and second internal electrodes of ceramic bodies including a first boundary internal electrode and a second boundary internal electrode, wherein all the other first and second internal electrodes of the ceramic bodies are interposed between the first and second boundary internal electrodes;
   a first external electrode formed of a conductive resin on the one end of the laminate and electrically connected to the plurality of first internal electrodes of the plurality of ceramic bodies; and
   a second external electrode formed of the conductive resin on the other end of the laminate and electrically connected to the plurality of second internal electrodes of the plurality of ceramic bodies,
   wherein in a vertical direction in which the ceramic bodies are stacked, each internal electrode of the ceramic body to which the first boundary internal electrode belongs, overlaps extension portions of only one of the first and second external electrodes, and in the vertical direction, each internal electrode of the ceramic body or the ceramic bodies to which the first boundary internal electrode does not belong, overlaps the extension portions of both of the first and second external electrodes, and the shortest distance, from the adhesive layer interposed between the ceramic body to which the first boundary internal electrode belongs and the ceramic body immediately adjacent to the ceramic body to which the first boundary internal electrode belongs, to any internal electrodes of the ceramic body immediately adjacent to the ceramic body to which the first boundary internal electrode belongs, is greater than a distance between the first boundary internal electrode and a bottom exterior surface of the laminate connected between the ends of the laminate.

5. The electronic component of claim 4, wherein a dielectric material interposed between the internal electrodes of the same ceramic body is different from a material forming the one or more adhesive layers.

6. The electronic component of claim 5, wherein the dielectric material is piezoelectric or electrostrictive.

7. The electronic component of claim 4, further comprising a metal layer plated on each external electrode.

8. An electronic component comprising:
   a laminate including a plurality of ceramic bodies stacked one on another and one or more adhesive layers interposed therebetween, each ceramic body including a plurality of first internal electrodes exposed to one end of the laminate and a plurality of second internal electrodes exposed to the other end of the laminate, and the first and second internal electrodes of ceramic bodies including a first boundary internal electrode and a second boundary internal electrode, wherein all remaining first and second internal electrodes of the ceramic bodies are interposed between the first and second boundary internal electrodes;
   a first external electrode formed of a conductive resin on the one end of the laminate and electrically connected to the plurality of first internal electrodes of the plurality of ceramic bodies; and
   a second external electrode formed of the conductive resin on the other end of the laminate and electrically connected to the plurality of second internal electrodes of the plurality of ceramic bodies,
   wherein a distance between the first boundary internal electrode and a bottom exterior surface of the laminate connected between the ends of the laminate is larger than a distance between the second boundary internal electrode and a top exterior surface of the laminate connected between the ends of the laminate, and is larger than any distances of the one or more adhesive layers to the internal electrodes which are immediately adjacent to the respective one or more adhesive layers.

9. The electronic component of claim 8, wherein the distance between the second boundary internal electrode and the top surface of the laminate connected between the ends of the laminate, and each distance between the one or more adhesive layers and the internal electrodes which are immediately adjacent to the respective one or more adhesive layers, are substantially equal to each other.

10. The electronic component of claim 8, wherein in a vertical direction along which the ceramic bodies stack, each internal electrode overlaps with extension portions of both of the first and second external electrodes.

11. An electronic component comprising:
   a laminate including a plurality of ceramic bodies stacked one on another and one or more adhesive layers interposed therebetween, each ceramic body including a plurality of first internal electrodes exposed to one end of the laminate and a plurality of second internal electrodes exposed to the other end of the laminate, and the first and second internal electrodes of ceramic bodies including a first boundary internal electrode and a second boundary internal electrode, wherein all the other first and second internal electrodes of the ceramic bodies are interposed between the first and second boundary internal electrodes;
   a first external electrode formed of a conductive resin on the one end of the laminate and electrically connected to the plurality of first internal electrodes of the plurality of ceramic bodies; and
   a second external electrode formed of the conductive resin on the other end of the laminate and electrically connected to the plurality of second internal electrodes of the plurality of ceramic bodies,
   wherein the ceramic body, which the first boundary internal electrode belongs to, includes a plurality of floating internal electrodes not electrically connected to any of the first and second external electrodes, and in the ceramic body, which the first boundary internal electrode belongs to, one of the first internal electrodes and one of the second internal electrodes are formed on a same plane, and
   a distance between the first boundary internal electrode and a bottom exterior surface of the laminate connected between the ends of the laminate is larger than a distance between the second boundary internal electrode and a top exterior surface of the laminate connected between the ends of the laminate, and is larger than any distances of the one or more adhesive layers to the internal electrodes which are immediately adjacent to the respective one or more adhesive layers.

12. The electronic component of claim 4, wherein a capacitance of the ceramic body which the first boundary internal electrode belongs to, is less than a capacitance of each remaining ceramic body.

* * * * *